United States Patent Office 3,422,333
Patented Jan. 14, 1969

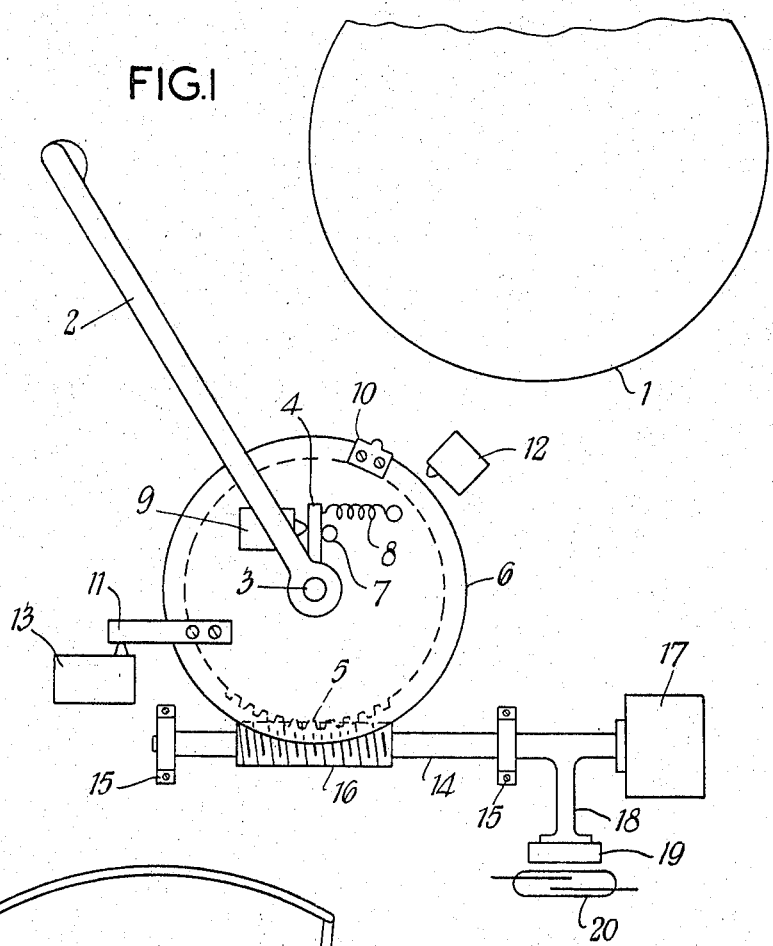
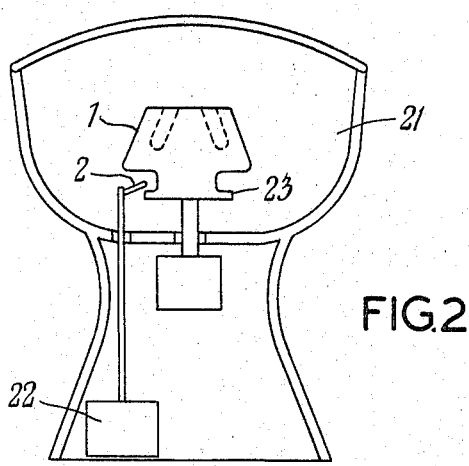

3,422,333
ARRANGEMENT FOR SENSING REQUIRED
SPEEDS OF A CENTRIFUGE
Brian Walter Lovegrove, Crawley, England, assignor to
MSE Holdings Limited, Crawley, England, a British
company
Filed Mar. 18, 1966, Ser. No. 535,548
Claims priority, application Great Britain, Nov. 11, 1965,
47,995/65
U.S. Cl. 318—333  16 Claims
Int. Cl. H02p 5/00

This invention relates to arrangements for sensing the required speeds of operation of a centrifuge, in particular the maximum speeds.

A centrifuge may be required to be operated with several different rotors or so-called heads which might be of different dimensions and therefore require different maximum operating speeds. Thus, the heavier rotors must not be operated above certain speeds which are much lower than those that can be tolerated with lighter rotors. Thus, it is necessary to know the required maximum speeds if excess speeds are to be avoidable.

In accordance with one aspect of the invention there is provided a centrifuge apparatus having a centrifuge capable of operating with different rotors and having an arrangement for sensing a required maximum speed of operation of a rotor of the centrifuge, such a rotor having, or having attached to it means providing, a surface the position of which in relation to the axis of rotation of the rotor characterises the required maximum speed of operation, the arrangement comprising a sensing member displaceable from a first position whereat the member is spaced from the surface of a rotor to a contact position in contact with said surface and vice versa, electrical signal generating means operable during the movement of the sensing member to produce an electrical signal during such movement characterising the distance moved by the sensing member from one of said positions to the other, and means responsive to the signal to adopt a condition characterising said distance and thus the required maximum speed.

In accordance with a second aspect of the invention there is provided a centrifuge apparatus having a centrifuge capable of operating with different rotors and having an arrangement for sensing a required maximum speed of operation of a rotor of the centrifuge, such a rotor having, or having attached to it means providing, a surface the position of which in relation to the axis of rotation of the rotor characterises the required maximum speed of operation, the arrangement comprising a sensing member displaceable from a first position whereat the member is spaced from said surface of a rotor to a contact position in contact with said surface and vice versa, electrical driving means operable to cause the sensing member to be moved from its first position to a contact position, means effective, when a contact position has been reached, to cause the sensing member to move back at least to the first position and means which, when the sensing member has moved back at least to the first position, is in a condition characterising the distance moved by the sensing member from one of said positions to the other and thus characterising the required maximum speed of a rotor.

Preferably the sensing member will have an initial free travel to the first position, but this free travel is not taken into account in the arrangement.

In one embodiment of the invention, the sensing member is resiliently coupled to electrical driving means so that strain in the mechanism is avoided when the member makes contact with the rotor surface. A signal is obtained from pulse producing means operated in synchronism with the driving means. Switching means are provided to sense when the sensing member has left its first position and also when it has made contact with the rotor surface in order to define the beginning and end of the useful sequence of pulses. This sequence of pulses is fed to a pulse operated mechanical selector which operates stepwise until a position has been reached corresponding to the number of pulses issued throughout the period of travel of the sensing member from its first position to its contact position. The selector at the set position appropriately operates circuits to set automatically the maximum allowable speed of rotation of the rotor. In this way both the sensing of the maximum speed and the prevention of overspeeding are effected automatically.

In cases where a centrifuge handles rotors of one type only and the rotors have an outer surface which is spaced from the axis of rotation in each case by a distance characterising the required maximum speed of rotation of the rotor, this outer surface of the rotor can constitute the surface upon which the sensing member acts. However, in other cases, it is desirable to employ in a centrifuge rotors of differing types some of which might not normally embody any surface which could be utilised. In such a case there will be attached to or integral with all such rotors a disc or other member having a surface against which the sensing member can be driven. In each case the disc or other member will be dimensioned in accordance with the required maximum speed of the rotor to which it is attached.

For a better understanding of the invention and to show how the same may be carried into effect, reference will now be made, by way of example, to the accompanying drawings, in which:

FIGURE 1 is a diagrammatic view of a centrifuge rotor having associated with it a mechanism for sensing the speed of rotation of the rotor of the centrifuge;

FIGURE 2 shows diagrammatically the mechanism of FIGURE 1 incorporated into a centrifuge the rotor of which is operated under a vacuum;

Figure 3:
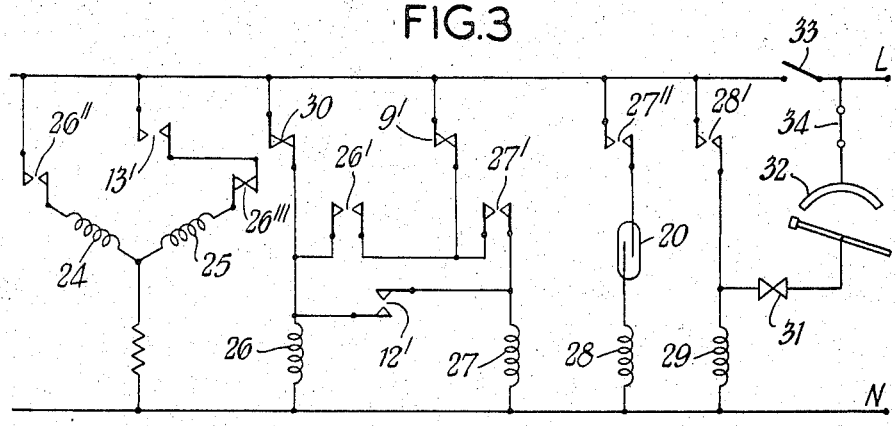
FIGURE 3 is a circuit diagram of the circuit employed with the mechanism of FIGURE 1.

FIGURE 1 shows diagrammatically the mechanism associated with a rotor 1 of a centrifuge for sensing automatically the required maximum speed of operation of the rotor 1. The mechanism incorporates a sensing member in the form of an arm 2 which is pivoted freely upon a shaft 3 and secured rigidly to a shorter arm 4. Secured to the shaft 3 is a worm wheel 5 carrying a disc 6. The disc 6 carries an upstanding stop 7 abutting the arm 4 and thus preventing clockwise movement of the arm 2 with respect to the disc 6 under the action of a tensioned spring 8. The disc 6 also carries a microswitch 9 having normally closed contacts and microswitch actuators 10 and 11. The actuator 10 is associated with a microswitch 12 secured with respect to the centrifuge housing and the actuator 11 is associated with a microswitch 13 also secured with respect to the centrifuge housing. The microswitches 12 and 13 have normally open contacts. A shaft 14 supported in bearings 15 extends adjacent the disc 6 and carries a worm 16 engaging the worm wheel 5 disposed immediately below the disc 6. The shaft 14 is driven by a forward- and reverse-running motor 17 and carries adjacent the motor an arm 18 at the free end of which is a magnet 19. On operating the motor 17, the magnet 19 follows a circular path adjacent which is a reed switch 20 having normally open contacts which are closed once every revolution of the shaft 4 by the magnet 19. The worm/worm wheel reducing ratio is 1:360, so that the arm 2 will move angularly by 1° between two closures of the reed switch 20. In the present case this means that rotors the radii of which differ by only ⅛″ can be distinguished. The angle traversed between two closures of the switch 20 determines the number of different rotors that can be clearly differentiated. Accordingly the angle traversed will be designed for a particular application and will thus vary from application to application. However it is preferred that the angle traversed should be less than 5° in order to obtain full advantage from the construction.

FIGURE 2 is a diagrammatic cross-section of the centrifuge having a rotor 1 enclosed in a vacuum-tight housing 21. In this case, most parts of the mechanism are disposed, as diagrammatically indicated at 22, externally of the housing 21, whilst the arm 2 is within the housing 21 and is carried by a shaft extending from the mechanism 22 through vacuum seal into the housing 21. The arm 4 secured with respect to the arm 2 is disposed in the mechanism at 22. In this example, a circular disc 23 is formed on the rotor 1 and it is against the outer curved surface of disc 23 that the arm 2 can abut when the arm 2 is permitted to rotate in a clockwise direction.

FIGURE 3 shows the circuit diagram of the operating circuit of the mechanism of FIGURE 1. In this circuit are illustrated the forward running winding 24 and the reverse running winding 25 of the motor 17; the reed switch 20; relays 26, 27 and 28 with their contacts 26′, 26″ and 26‴, 27′ and 27″, and 28′ respectively; contacts 9′ of the microswitch 9; the contacts 12′ of the microswitch 12; the contacts 13′ of the microswitch 13; the coil 29 of a 25-point uni-selector; the home contacts 30 of the uni-selector; the interrupter contacts 31 of the uni-selector; the homing arc 32 of the uni-selector; and switches 33 and 34 operated by the lid of the centrifuge.

FIGURE 3 shows the contact positions when the lid of the centrifuge is open, the switch 33 being open so that power is not supplied to the motor 17. When the lid is closed the switch 33 closes causing energisation of the relay 26 through the contacts 30 of the uni-selector which is at this time in its first position. Energisation of relay 26 causes closure of its contacts 26′ to complete a holding circuit for the relay 26 through contacts 9′, closure of its contacts 26″ to connect the forward-running winding 24 of the motor to the supply, and opening of its contacts 26‴ to prevent reverse running of the motor. The motor therefore commences to operate, driving the shaft 14 and causing the reed switch 20 to close its contacts once every revolution of the shaft 14. At this stage, contacts 27″ are open so operation of the reed switch is ineffective. Rotation of the shaft 14 also causes rotation of the disc 6, which latter rotation permits the rotation of the arm 2 under the action of spring 8 towards the rotor 1, or towards the disc 22 in FIGURE 2. The arm 2 is restrained from rotation faster than that of the disc 6 by the stop 7. Rotation of the disc 6 displaces the actuator 11 from the microswitch 13 the contacts 13′ of which therefore close to prepare the reverse-running circuit of the motor 17. Further rotation of the disc 6 brings the actuator 10 into contact with the microswitch 12 causing the closure of its contacts 12′ and thus the energisation of the relay 27 and the closure of its contacts 27′ to complete the holding circuit for relay 27. The energisation of the relay 27 signals the start of the pulse counting operation owing to the resultant closure of the contacts 27″ to complete the circuit containing the reed switch 20. A each closure of the reed switch, the relay 28 is operated to close contacts 28′ and thus to step the uni-selector by one position. Continued rotation of the shaft 14 causes stepping of the uni-selector until the arm 2 makes contact with the rotor 1 whereupon the microswitch 9 is operated to open its contacts 9′ and therefore to release the holding circuits of the relays 26 and 27. The resultant de-energisation of the relay 27 causes the opening of the contacts 27″ and thus stops the feeding of pulses to the uni-selector. The uni-selector now remains in a position determined by the number of pulses emitted from the time of operating of the microswitch 12 to the time of operation of the microswitch 9. The de-energisation of relay 26 produces the closure of contacts 26‴ and the opening of contacts 26″ to cause reverse running of the motor 17 and therefore anticlockwise rotation of the disc 6 to displace the arm 2 away from the rotor 1 until the actuator 11 reaches microswitch 13, whereupon the current supply to the motor reverse winding 25 is terminated by the opening of contact 13′ and the mechanism comes to a stop with the uni-selector remaining in its selected position.

A second bank of uni-selector contacts are in a suitable overspeed protection circuit and by the selection of a uni-selector position in the manner described the required maximum speed of the rotor is determined in this protection circuit to prevent the maximum speed from being exceeded.

When the lid of the centrifuge is opened to remove the rotor and to replace it with another, the switch 34 is closed whereby the uni-selector steps itself on to its initial or home position by the action of the interrupter contacts 31 and the use of the homing arc 32. At this stage, all the contacts are again in the position as illustrated in FIGURE 3 in readiness for a further operation.

Figure 4:
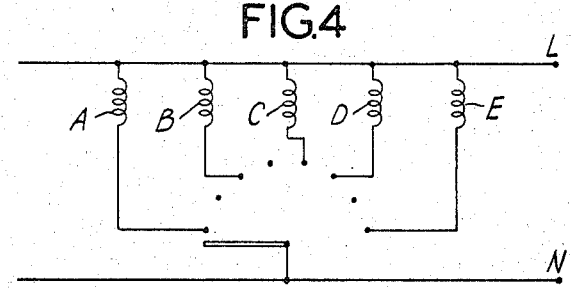
FIGURES 4 and 5 are circuit diagrams of a speed selection circuit.
Figure 5:
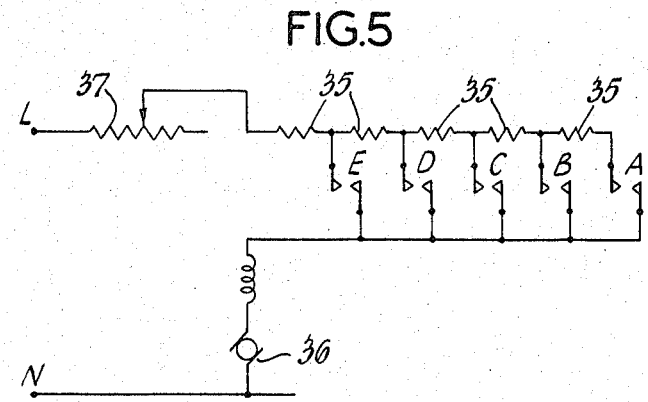

FIGURE 4 shows the second bank of contacts of the uni-selector in an overspeed protection circuit a further part of which is shown in FIGURE 5. Relay windings A to E are connected to appropriate contacts of the second bank and thus selection of the uni-selector position by the circuit of FIGURE 3 also selects an appropriate relay to the contacts of which (shown in FIGURE 5) are accordingly closed. Closure of the contacts of a relay short circuits one or more of resistances 35 and thus modifies the total resistance connected in series with the series connected induction motor 36 which drives the centrifuge. Accordingly the selection of the uni-selector position determines which of relays A to F is operated, the maximum resistance in series with the centrifuge motor and thus the maximum speed of the centrifuge. Manual selection of the centrifuge speed for values *below* the determined maximum is possible by adjustment of a rheostat 37.

I claim:
1. A centrifuge apparatus capable of operating with different rotors and having an arrangement for sensing the required maximum speed of operation of the rotor of the centrifuge, such a rotor having means providing a surface the position of which in relation to the axis of rotation of the rotor characterises the required maximum speed of operation, the arrangement comprising: a sensing member displaceable from a first position whereat said member is spaced from said surface of a rotor to a contact position in contact with said surface; a first rotatably mounted member; first coupling means coupling said sensing member and said first member for simultaneous proportional movement; a second rotatably mounted member; second coupling means coupling said first and second members for simultaneous rotation with said second member rotating at a greater angular velocity than said first member; pulse generating means having an actuating part carried by said second member for producing during movement of the sensing arm a series of pulses the number of which pulses in said series is related to the distance moved by said sensing member from one of said first position and said contact position to the other; means responsive to said pulses to adopt a condition characterising said distance and thus said required maximum speed; and an overspeed protection circuit controlled by said means responsive to said pulses for preventing operation of a rotor at a speed greater than the sensed maximum speed.

2. An apparatus as claimed in claim 1, wherein said sensing member is pivotally mounted for pivotal movement from said first position to a contact position and vice versa from said contact position to said first position.

3. An apparatus as claimed in claim 1, in which there are electrical driving means operable to cause said sensing member to move from said first position to a contact position and means effective, when said contact position has been reached, to cause said sensing member to move back at least to said first position.

4. An apparatus as claimed in claim 3, and comprising: a rotatably mounted driving member to which said sensing member is pivotally mounted; means drivably coupling said electrical driving means to said driving member; spring means acting upon said sensing member to urge it in a direction from said first to a contact position; and an abutment secured with respect to said driving member and effective to prevent rotation of said sensing member with respect to said driving member in the direction from said first to a contact position when said sensing member abuts said abutment.

5. An apparatus as claimed in claim 2, wherein said coupling means are such that at least one pulse is produced by said generating means in a 5° movement of said arm.

6. An apparatus as claimed in claim 5, wherein one pulse is produced in about a 1° movement of said arm.

7. A centrifuge apparatus comprising a centrifuge having a variable speed motor and being capable of operating with different rotors and an arrangement for sensing the required maximum speed of operation of a rotor of said centrifuge, such a rotor having means providing a surface the position of which in relation to the axis of rotation of said rotor characterises said required maximum speed of operation, and the arrangement comprising: a sensing arm pivotally movable from a first position whereat said member is spaced from said surface of a rotor to a contact position in contact with said surface and pivotally movable from said contact position to said first position electrically operable driving means having a rotatable output member; pulse generating means drivably coupled to said output member of said electrically operable driving means to produce a series of pulses in which the number of pulses is proportional to the number of revolutions of said output member of said driving means; a first rotatable member; means coupling said first member and said sensing arm for simultaneous proportional displacement; means coupling said first and output members for simultaneous rotation with said first member rotating at a lower angular velocity than said output member; pulse sensitive means for receiving pulses from said pulse generating means and for adopting a position characterising the number of pulses received; sensing means for sensing said first and contact positions to permit reception at said pulse sensitive means of pulses only during the movement of said arm from one of said first and contact positions to the other; and an overspeed protection circuit controlled by said means responsive to said pulses for preventing operation of a rotor at a speed greater than the sensed maximum speed.

8. An apparatus as claimed in claim 7, wherein said sensing arm is pivotable with respect to said first member; spring means urge said sensing arm in a direction from said first position to a contact position; and an abutment limits relative movement in said direction of said sensing arm with respect to said first member.

9. An apparatus as in claim 8 and comprising: first switch means operable by said first member to define said first position; second switch means operable when the contact position has been reached; and a reversing circuit including said centrifuge motor and said second switch for reversing the direction of operation of said electrical driving means when said second switch is operated.

10. An apparatus as claimed in claim 7, wherein said pulse generating means comprises: a magnetically operable switch; and a magnetised member coupled to said output member of said driving means to rotate therewith along a path extending adjacent said magnetically operable switch.

11. An apparatus as claimed in claim 7, wherein the sensing arm has an initial movement from an initial position to the first position and wherein there are third switch means actuated when said sensing arm is displaced to said initial position to stop operation of said driving means.

12. An apparatus as claimed in claim 7, wherein said pulse sensitive means are constituted by a uniselector mechanism.

13. An apparatus as claimed in claim 7, and comprising: a lid of said centrifuge; and switch means operated by closure of said lid to render operable said arrangement for sensing said required maximum speed.

14. An apparatus as claimed in claim 7, wherein said coupling means are such that at least one pulse is produced by said generating means in a 5° movement of said arm.

15. An apparatus as claimed in claim 14, wherein one pulse is produced in about a 1° movement of said arm.

16. An apparatus comprising: a centrifuge capable of operating with different rotors; a motor for driving said centrifuge; overspeed protecting circuit means including said motor and operable to prevent rotation of said motor above a selected speed; a pulse operated mechanical selector in said circuit means for controlling said circuit means to select a maximum speed in accordance with the condition of said selector; pulse generating means for feeding pulses to said selector; a pivoted sensing arm movable from a rest position through a predetermined position to a contact position in contact with a surface provided by a rotor of said centrifuge; a first member rotatably mounted for movement with respect to said sensing arm; spring means urging said sensing arm in a direction from said initial position to a contact position; abutment means limiting movement in said direction of said arm with respect to said first member; electrically operable driving means having a rotatable output member; a second rotatably mounted member coupling said output member of said driving means to said first member; coupling means coupling said second member to said first member for rotation of said first member at a lower angular velocity than that of the said second member; pulse generating means having an actuating part carried by said second member for producing a given number of pulses for a given number of rotations of said second member; circuit means coupling said generating means to said mechanical selector; first switch means operated when said predetermined position of said arm is reached; second switch means operated when a contact position is reached; said first and second switch means connected in said circuit means so as to permit the passage of pulses to said mechanical selector only after operation of said first switch means and until operation of said second switch means; a driving means reversing circuit containing said second switch means and reversing the direction of operation of said driving means on operation of said second switch means; and third switch means operated when said initial position is reached to stop the operation of said driving means.

References Cited

UNITED STATES PATENTS 2,620,462  12/1952  Berthiez _____ 318—358 X
3,069,777  12/1962  Isbell.

ORIS L. RADER, *Primary Examiner.*

H. HUBERFELD, *Assistant Examiner.*

U. S. Cl. X.R.

33—172; 318—358